United States Patent
Lesko et al.

[19]
[11] Patent Number: 5,922,948
[45] Date of Patent: *Jul. 13, 1999

[54] THERMAL IMAGING SYSTEM FOR INTERNAL COMBUSTION ENGINES

[75] Inventors: Jon M. Lesko, Arvada; Timothy M. Samaras, Lakewood, both of Colo.

[73] Assignee: Colorado Seminary dba University of Denver, Denver, Colo.

[*] Notice: This patent is subject to a terminal disclaimer.

[21] Appl. No.: 08/370,153

[22] Filed: Jan. 9, 1995

[51] Int. Cl.⁶ .................................................. G01M 15/00
[52] U.S. Cl. ............................................................ 73/117.3
[58] Field of Search ............................ 73/35, 117.3, 116, 73/23.31, 1 G; 374/144, 120, 121, 130, 131

[56] References Cited

U.S. PATENT DOCUMENTS

| | | | |
|---|---|---|---|
| 2,841,979 | 7/1958 | Harbert | 73/35 |
| 3,517,247 | 6/1970 | Szilagyi | 73/35 |
| 3,584,509 | 6/1971 | Compton | 374/144 |
| 3,759,151 | 9/1973 | Metz | 95/11 |
| 4,377,086 | 3/1983 | Linder et al. | 73/35 |
| 4,393,687 | 7/1983 | Müller et al. | 73/35 |
| 4,409,815 | 10/1983 | Burkel et al. | 73/35 |
| 4,419,212 | 12/1983 | Dietz et al. | 204/424 |
| 4,422,323 | 12/1983 | Linder et al. | 73/116 |
| 4,425,788 | 1/1984 | Franke et al. | 73/35 |
| 4,437,334 | 3/1984 | Laurenz | 73/35 |
| 4,444,043 | 4/1984 | Hattori et al. | 73/35 |
| 4,446,723 | 5/1984 | Böning et al. | 73/35 |
| 4,452,072 | 6/1984 | Damson et al. | 73/35 |
| 5,052,214 | 10/1991 | Dils | 73/35 |
| 5,067,463 | 11/1991 | Remboski et al. | 123/425 |
| 5,099,681 | 3/1992 | Dils | 73/35 |
| 5,113,828 | 5/1992 | Remboski et al. | 123/425 |
| 5,195,359 | 3/1993 | Kubota et al. | 73/35 |

FOREIGN PATENT DOCUMENTS

| | | |
|---|---|---|
| 3-48742 | 3/1991 | Japan . |
| 2130717 | 6/1984 | United Kingdom . |

OTHER PUBLICATIONS

Oct. 7, 1991 The Cylinder Head Temperature Measurement by Thermal Imaging Technique H. Xhao and N. Collings, Dept. Of Engineering, Cambridge Univ. Doc. #912404.

*Primary Examiner*—Hezron Williams
*Assistant Examiner*—Richard A. Moller
*Attorney, Agent, or Firm*—Dorr, Carson, Sloan & Birney, P.C.

[57] ABSTRACT

A thermal imaging system for use in an internal combustion engine employs a removable optical housing that is inserted through a hole in the cylinder wall or the cylinder head. The distal end of the housing supports a lens made of a material such as polycrystalline spinel or sapphire to provide a desired field of view within the cylinder and to project an image from the field of view through the internal passageway of the optical housing. A camera receives and records the image provided by the lens and optical housing. In one embodiment, the distal portion of the optical housing is secured to the cylinder wall by means of threads or a breech-mount mechanism to permit quick and easy removal and cleaning of the lens. In another embodiment, the distal end of the optical housing is inserted into the cylinder through a spark plug housing. The optical housing is secured to the cylinder head by a formed hole in a support bracket. A thermocouple or heat flux gauge can be mounted to the cylinder wall within the field of view of the thermal imaging system to provide a reference point for temperature measurements.

24 Claims, 9 Drawing Sheets

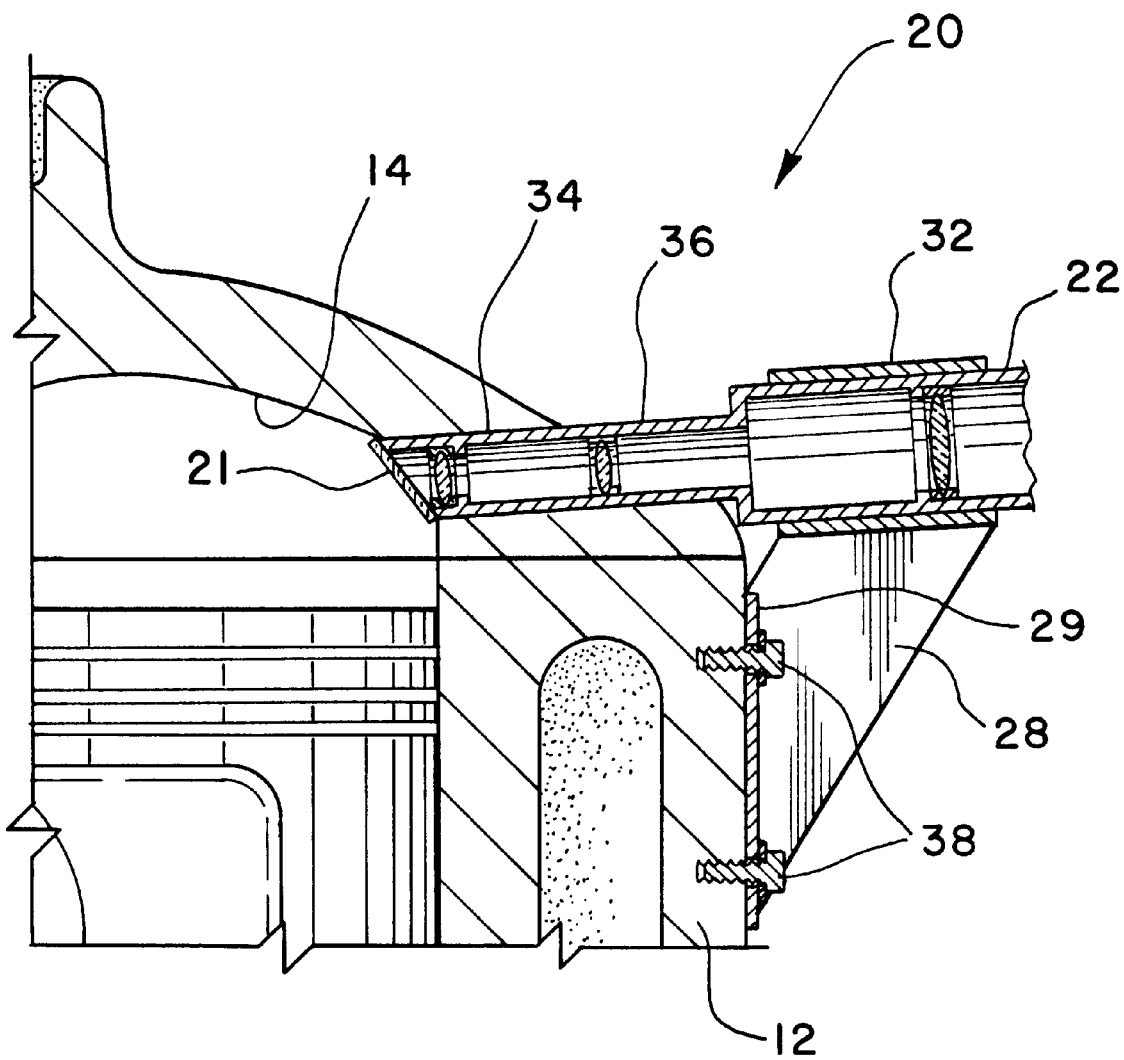

THERMAL IMAGING SYSTEM FOR INTERNAL COMBUSTION ENGINES

RELATED APPLICATION

The present application is a continuation in part of the applicants' co-pending U.S. patent application Ser. No. 08/185,506, entitled "Thermal Imaging System for Internal Combustion Engines", filed on Jan. 24, 1994.

BACKGROUND OF THE INVENTION

1. Field of the Invention

The present invention relates generally to the field of thermal imaging systems. More specifically, the present invention discloses a thermal imaging system for viewing within the cylinder of an internal combustion engine.

2. Statement of the Problem

In designing and testing internal combustion engines, it is advantageous to know the temperature profile of the various surfaces within the cylinder, including the cylinder head and valves, while the engine is in operation. For example, thermal images from within the engine cylinder can be used to detect localized hot spots and to study combustion chamber deposits.

Ideally, a thermal imaging system should be suitable for use with a wide variety of actual production engines, and should not be limited to a specially constructed engine used for testing. In addition, the system should not require extensive modifications to the engine to accommodate the imaging system. Extensive modification of the engine increases the risk that the image data generated by the system does not accurately reflect conditions within an actual production engine.

It is also important to be able to quickly and easily remove those portions of the imaging system that are exposed within the engine cylinder for the purpose of cleaning. Films and combustion deposits tend to accumulate rapidly on the exposed optical elements of the system. In particular, it should not be necessary to disassemble the entire engine to clean or replace the optical train.

A number of optical sensors for internal combustion engines have been invented in the past, including the following:

| Inventor | Patent No. | Issue Date |
|---|---|---|
| Linder et al. | 4,377,086 | Mar. 22, 1983 |
| Müller | 4,393,687 | Jul. 19, 1983 |
| Linder et al. | 4,422,323 | Dec. 27, 1983 |
| Franke et al. | 4,425,788 | Jan. 17, 1984 |
| Hattori et al. | 4,444,043 | Apr. 24, 1984 |
| Böning et al. | 4,446,723 | May 8, 1984 |
| Dils | 5,052,214 | Oct. 1, 1991 |
| Remboski et al. | 5,067,463 | Nov. 26, 1991 |
| Dils | 5,099,681 | Mar. 31, 1992 |
| Remboski et al. | 5,113,828 | May 19, 1992 |
| Kubota et al. | 5,195,359 | Mar. 23, 1993 |
| Kubota et al. | Japan 3-48742 | July 18, 1989 |

Zhao et al., "The Cylinder Head Temperature Measurement by Thermal Imaging Technique," SAE Technical Paper Series 912404 (October 1991)

The patents of Linder et al. show two optical sensors for combustion chambers. Both apparently use a photodetector (e.g., a photo diode) to monitor the overall luminosity of the combustion process. The patents of Linder et al. are representative of a large body of prior art in the field of "knock detectors" that are concerned with monitoring overall luminosity during the combustion cycle, rather than providing a thermal image of the interior of the combustion chamber. The Linder '323 patent shows an optical window that can be removed for cleaning.

Müller et al. describe an optical sensor incorporated in a spark plug housing for use in a knock sensor. The optical pickup is a quartz glass rod that detects the oscillations of the fuel-air mixture as variations in brightness. The end of the glass rod is located centrally between the spark gaps. No image is provided.

Franke et al. disclose a combustion monitoring system for a multi-cylinder engine to detect knocking. Each cylinder is equipped with fiber optics to direct light from within the cylinder to a photo diode to measure overall luminosity. Here again, no image is provided.

Hattori et al. disclose another example of the knock detector for internal combustion engines. An illumination detector 10 is threaded through the cylinder head. The illumination detector is made of quartz glass or sapphire (column 3, line 16 and column 4, lines 61–65).

Böning et al. disclose a further optical sensor incorporated in a spark plug housing for use in a knock sensor. Here again, the optical pickup is a quartz glass rod. The end of the rod facing the combustion chamber is coated with a layer of graphite 13.

The Dils patents discuss a knock detector using an optical fiber and a black body emitter to sense variations in heat flow within the cylinder.

The two patents of Remboski et al. disclose an internal combustion engine having a luminosity detector. The system controls operation of the engine based in part on the luminosity signal. The optical probe 19 is made of synthetic sapphire (column 4, lines 43–46 of the '828 patent).

Kubota et al. disclose another example of an optical system for detecting knocking in an internal combustion engine. The system uses a sapphire rod 1 (or 22) with a black body 2 (or 23) covering the end of the rod within the combustion chamber to measure heat flux.

The SAE paper by Zhao et al. discloses a thermal imaging system for measuring the temperature profile of the cylinder head of an internal combustion engine. A schematic drawing of this system is provided in FIG. 3 of the SAE paper. The system requires a specially modified engine cylinder and piston having a window in the side wall of the cylinder, a window in the side wall of the piston, a 45° mirror within the piston, and a silicon window that replaces the head of the piston. The cylinder head is painted black to provide a high and uniform emissivity across its surface. In addition, a number of thermocouples are mounted onto the cylinder head, as shown in FIG. 4 of the SAE paper, to provide reference temperature readings. It should also be noted that the camera is only able to view the mirror and cylinder head during those portions of the combustion cycle when the windows in the cylinder wall and piston wall are in vertical alignment.

3. Solution to the Problem

None of the prior art references uncovered in the search show a system for viewing thermal images from within the combustion chamber (as opposed to measuring overall luminosity) using a removable optical probe that is inserted through the wall of the cylinder or as an integral part of a spark plug. In addition, none of the prior art references disclose: (1) use of polycrystalline spinel in an optical probe; (2) use of a black body/thermocouple within the field of view of the optical probe for temperature calibration; or (3) use of a side-viewing optical probe.

SUMMARY OF THE INVENTION

This invention provides a thermal imaging system for use in an internal combustion engine having a removable optical housing that is inserted through a hole in the cylinder wall or that is an integral part of a spark plug. The distal end of the housing supports a lens made of a material such as polycrystalline spinel or sapphire to provide a desired field of view within the cylinder and to project an image from the field of view through the internal passageway of the optical housing. A camera receives and records the image provided by the lens and optical housing. In one embodiment for the thermal imaging system in which the optical housing is inserted through the cylinder wall, the distal portion of the optical housing is secured to the cylinder wall by means of threads or a breech-mount mechanism to permit quick and easy removal and cleaning of the lens. In an alternative embodiment, the distal end of the optical housing is inserted into the cylinder through a spark plug housing. The optical housing is secured to the cylinder head by a formed hole in a support bracket. A thermocouple or heat flux gauge can be mounted to the cylinder wall within the field of view of the thermal imaging system to provide a reference point for temperature measurements.

A primary object of the present invention is to provide a system for obtaining thermal images from within virtually any internal combustion engine without requiring substantial modification of the engine.

Another object of the present invention is to provide a thermal imaging system having an optical probe that can be easily removed for the engine for cleaning.

Yet another object of the present invention is to provide a thermal imaging system in which the field of view within the engine cylinder can be readily changing by adjusting the position of the optical housing or by substituting different optical housings with various types of optical elements.

BRIEF DESCRIPTION OF THE DRAWINGS

The present invention can be more readily understood in conjunction with the accompanying drawings, in which:

FIG. 1B is a cross-sectional view of the cylinder of an internal combustion engine showing the lens assembly 20 held in place through a hole in the cylinder wall 12 by means of a breech-mount assembly.

DETAILED DESCRIPTION OF THE INVENTION

Figure 1A:
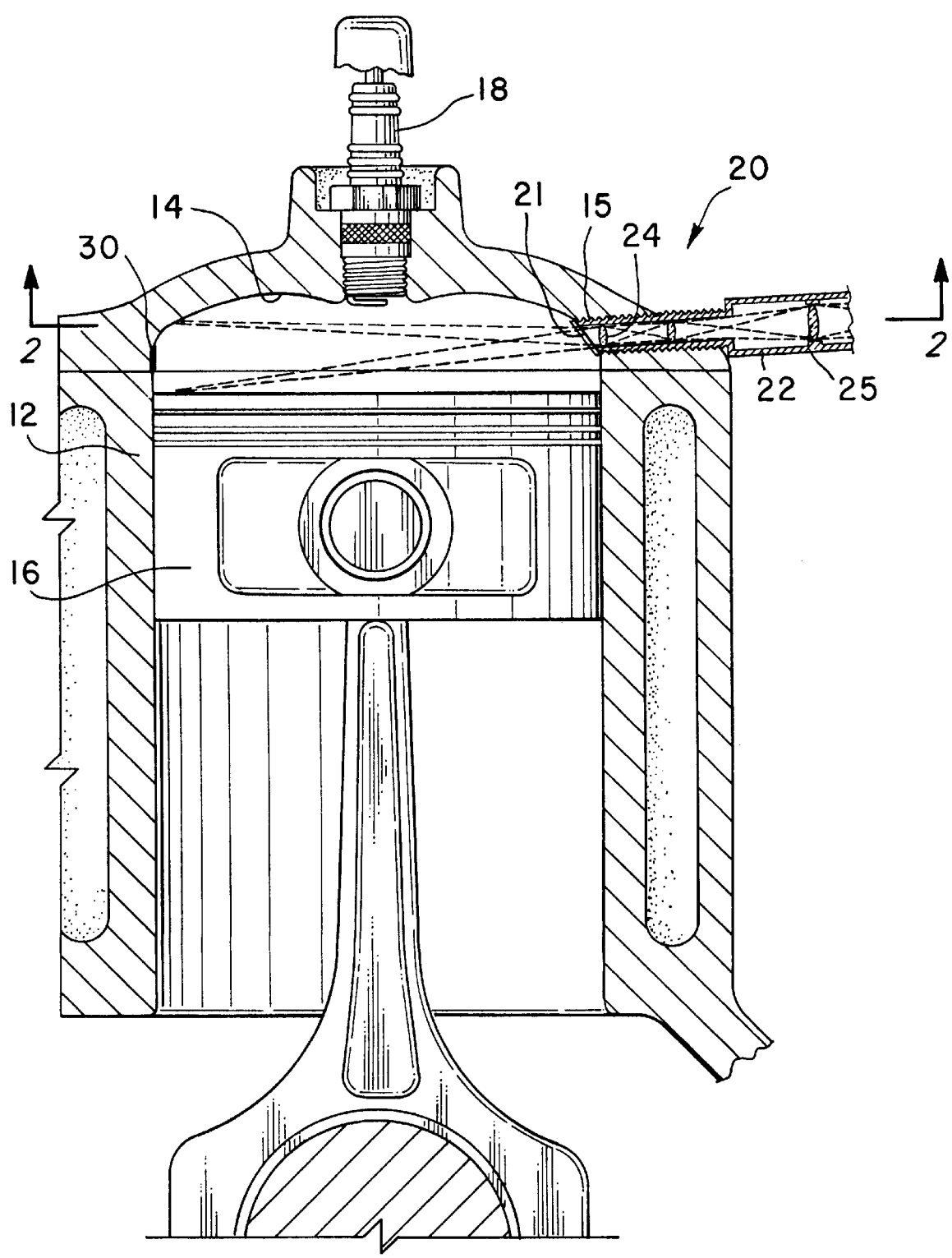
FIG. 1A is a cross-sectional view of the cylinder of an internal combustion engine showing the lens assembly 20 of the present invention threaded through a hole 15 in the cylinder wall 12.

Turning to FIGS. 1A and 1B, simplified cross-sectional views are provided of one cylinder of an internal combustion engine that has been retrofitted with an optical probe in accordance with the present invention. The engine includes a conventional cylinder wall 12, cylinder head 14, and piston defining a combustion chamber. Intake and exhaust valves 17 shown in FIG. 2 allow a fuel/air mixture to be drawn into the combustion chamber, ignited by a spark plug 18, and exhausted in the conventional manner, for either a two-stroke or four-stroke engine.

The present invention permits the engine to be retrofitted with an optical probe assembly 20 simply by drilling a hole 15 through the cylinder wall 12 or cylinder head 14, as illustrated in FIG. 1A. The hole 15 is threaded to engage corresponding threads on the exterior of the optical probe housing 20. However, other equivalent means could be employed for securing the optical probe housing in the hole through the cylinder wall.

For example, FIG. 1 B illustrates another embodiment in which the housing 22 of the optical probe assembly 20 extends through a hole 34 in the cylinder wall 12 and is held in place by means of a breech-mount mechanism or an indexing fixture that has been secured to the exterior of the engine. For example, the breech-mount mechanism can be designed similar to those used to removably attach a conventional camera lens to the camera body. The distal end 36 of the optical probe housing 22 is initially inserted through the breech-mount mechanism 32 and then into the hole 34 in the cylinder wall 12. The position of the breech-mount mechanism 32 is fixed relative to the engine by a bracket 28 connected to a flange 29 that has been bolted 38 to the exterior of the engine as shown in FIG. 1 B. The shape of the opening through the breech-mount mechanism 32 and the exterior surface of the optical probe housing 22 are keyed to one another so that the housing 22 can be rotated about its longitudinal axis by a predetermined number of degrees relative to the breech-mount mechanism in order to lock or unlock the housing 22 in the breach-mount mechanism. For example, the optical probe housing 22 can be initially inserted through the breech-mount mechanism 32 and then rotated by 90 degrees in the clockwise direction to lock the housing 22 in place. The optical probe housing 22 then can be removed at any time by rotating it 90 degrees in the counterclockwise direction to unlock the housing 22 from the breech-mount mechanism 32.

Figure 2:
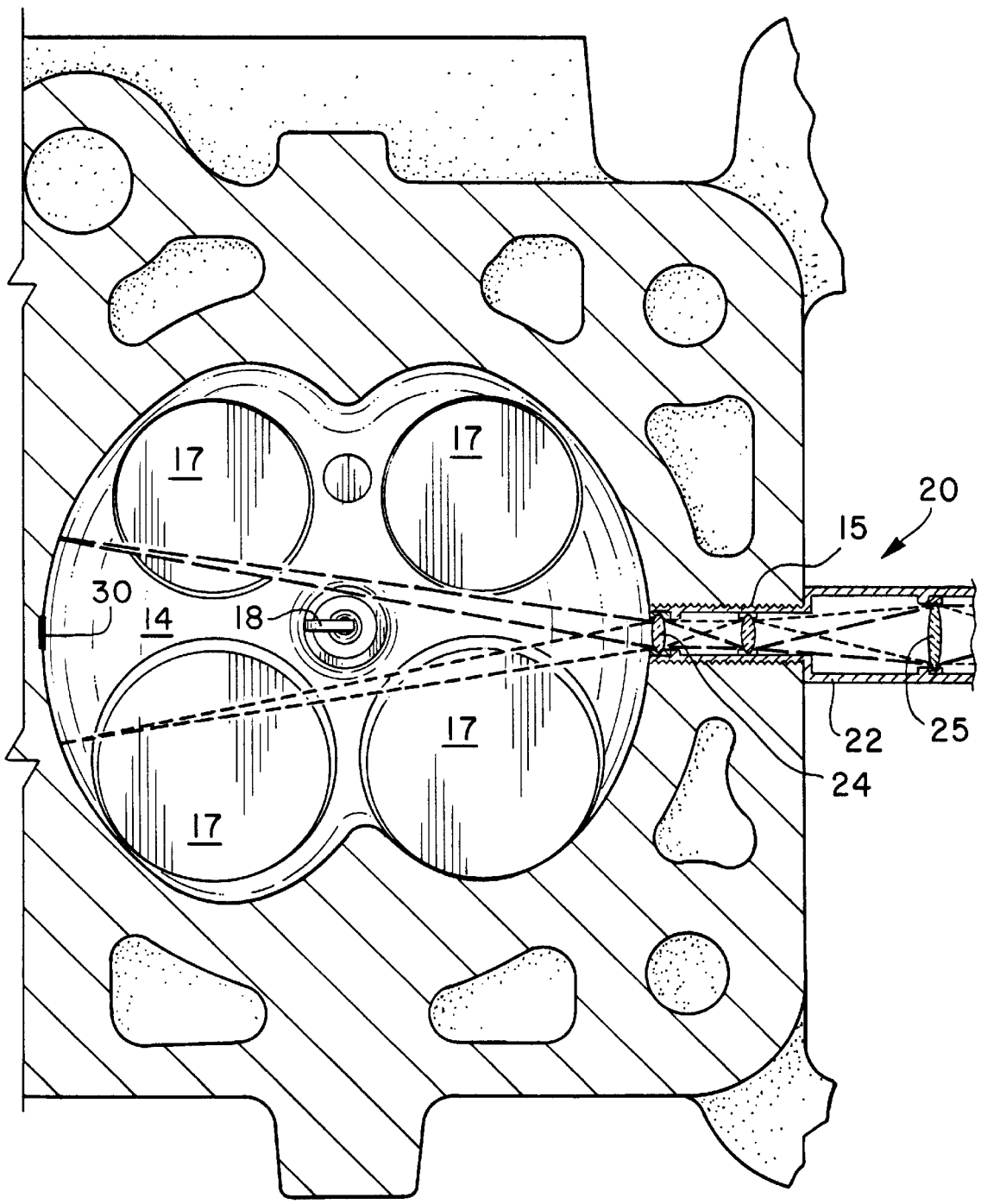
FIG. 2 is another cross-sectional view corresponding to FIG. 1 showing the cylinder head 14 and the field of view of the lens assembly 20.

FIG. 2 is a cross-sectional view corresponding to FIG. 1A showing the cylinder head 14 and the field of view of the lens assembly 20 after the optical probe 20 has been inserted through the hole 15. In its simplest form, the housing 22 of the optical probe 20 has a tubular shape with an internal passageway extending from the distal opening to the proximal opening of the tube. The exterior surface of the distal end of the housing has threads to removably engage corresponding threads in hole 15 in cylinder wall 12, as previously mentioned. The distal portion of the optical housing 22 extends well into the hole 15 in cylinder wall as shown in the drawings. An objective lens 24 is supported by the distal end of optical housing. This lens 24 projects an image along the internal passageway of the optical housing 22 from a field of view within cylinder, as shown by the ray tracings in FIGS. 1A and 2. In the preferred embodiment, the objective lens 24 seals the distal opening of the optical housing, and the optical housing completely seals the hole 15 in the cylinder wall 12, so as not to result in loss of cylinder pressure or otherwise interfere with normal operation of the engine.

It should be noted that the optical housing 20 can be quickly and easily removed by unthreading it from the hole 15 in the cylinder wall. This feature makes it particularly easy to clean films or deposits that inevitably accumulate on the exposed surface of the objective lens 24. Different optical assemblies can also be readily interchanged to view different regions within the cylinder or to provide different optical properties. In one embodiment, the optical housing 20 is threaded into a hole 15 in the cylinder wall or cylinder head, as previously described. Alternatively, the optical housing can be removably secured in the hole by means of a breech-mount mechanism or bayonet-mount mechanism, similar to those used for mounting a camera lens to a camera body. In yet another embodiment, as discussed herein below and shown in FIG. 8, the optical housing can be inserted in a specially designed spark plug 18.

In the preferred embodiment, the objective lens 24 is made of polycrystalline spinel, or possibly sapphire. Additional lens 25 and 26 can be included in the optical probe to project the image along the interior of the optical housing, and to properly focus the image for the camera 50 at the proximal end of the optical housing. The objective lens is directly exposed to the combustion chamber and therefore is subject to extreme temperature and pressure conditions while the engine is in operation. The lens must also be scratch-resistant and able to withstand severe vibration.

As shown in FIGS. 1A and 1B, a transparent window 21 that at least partially conforms to the contour of the combustion chamber wall is placed over the distal end of the optical probe housing in front of the objective lens 24. The window 21 is preferably also made of spinel or sapphire. Depressions or cavities in the combustion chamber tend to promote fuel dropout from the homogeneous fuel-air mixture within the cylinder. This results in incomplete combustion, which tends to create carbon deposits in the depression or cavity. The window 21 is intended to reduce this deposition of carbon on the distal end of the optical probe housing. The window 21 also helps to protect the objective lens 24 from thermal and mechanical stresses. In addition, since the window 21 is merely a transparent sheet, it is typically far less costly to replace than the objective lens 24 in the event that it is scratched or broken during use.

Spinel offers exceptionally strong and hard mechanical properties. In particular, spinel is very resistant to scratches, pitting, and cracking. It has good chemical resistance to compounds typically found in internal combustion processes. Spinel has moderate thermal expansion characteristics over a wide range of temperatures that are roughly the same as the thermal expansion characters for the cylinder wall. Spinel is also able to transmit images over a wide bandwidth from ultraviolet (approximately 0.2 mm), through the visible light spectrum, and beyond to approximately 6.5 mm in the infrared without absorption peaks. For example, still photographs in the visible light spectrum can be used to provide spatial references for thermographs in the infrared range. Finally, spinel is relatively low cost.

The term "spinel" is often employed to denote any one of a group of materials having analogous chemical compositions that are crystallized in an isometric system with an octahedral habit. Some of the more important minerals of the spinel group are spinel ($MgAl_2O_4$), gahnite, zinc spinel ($ZnAl_2O_4$), franklinite ($Zn,Mn^{2+},Fe^{2+}$)($Fe^{3+},Mn^{3+}$)$_2O_4$, and chromite ($FeCr_2O_4$). These minerals also may be thought of as combinations of bivalent and trivalent oxides of magnesium, zinc, cerium, lanthanum, iron, manganese, aluminum, and chromium, having the general formula: $R^{2+}O \cdot R_2^{3+}O_3$. Thus, the bivalent oxides may be MgO, ZnO, FeO, and MnO. The trivalent oxides may be $Al_2O_3$, $Fe_2O_3$, $Mn_2O_3$, $La_2O_3$, $Ce_2O_3$, and $Cr_2O_3$. In another sense, spinels may be thought of as being comprised of a first metal having a first oxidation state and a second metal having an oxidation state higher than that of the first metal, and wherein each metal is appropriately associated with oxygen in a spinel lattice structure. The first and second metals may even be the same metal (in two or more different oxidation states). Spinels can also be composed of materials having variable ratios of oxides of more than one metallic element homogeneously distributed through a crystalline matrix that is held together by loose crystalline lattice bonding. The atomic ratio of the first metal to the second metal in any given spinel need not be consistent with the classical stoichiometric formulas. Thus, in an even broader sense, spinels may be thought of as being composed of bivalent and trivalent metallic oxides of continuously varying proportions, i.e., materials having the general formula: $nR^{2+}O \cdot mR_2^{3+}O_3$, wherein the ratio of n to m may vary. Those skilled in the art will appreciate that continuously variable ratios of atoms are not at all unusual in those materials commonly called "solid solutions."

Sapphire is also able to transmit images over a relatively wide bandwidth. The choice of optical materials for the primary lens can be tied to the specific range of optical wavelengths that are of interest. A number of materials can be readily substituted for use in narrow bands. However, for wide band applications, spinel and sapphire are the clear choices.

A number of thermocouples or heat flux gauges 30 can be attached to the cylinder wall 12 or cylinder head 14 within the field of view of the optical assembly. For example, a thin film thermocouple can be used to provide a reference point for temperature measurements on the image. This reference point provides independent verification and calibration of temperature conditions that can be measured from the thermographic images produced by the optical assembly. A heat flux gauge not only provides a reference temperature, but also measures the heat flux through the cylinder wall at that point. This feature can be useful in thermodynamic analysis of the engine.

Figure 3:
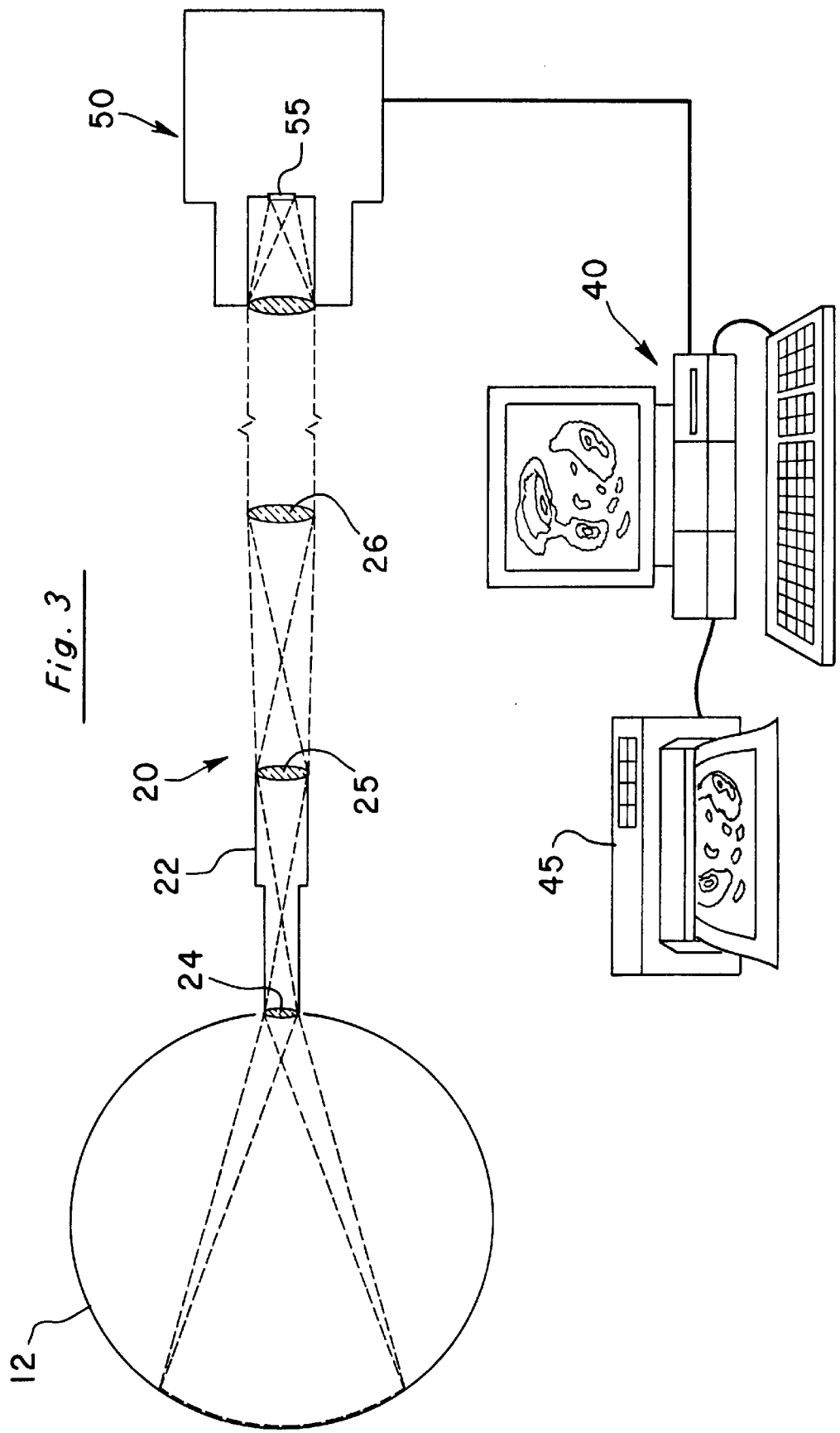
FIG. 3 is a schematic diagram of the lens assembly 20, CCD camera 50, and computer imaging system 40.

FIG. 3 is a schematic diagram of the optical assembly 20, CCD camera 50, and computer imaging system 40. The objective lens 24 projects an image from a field of view within the cylinder 12 along the internal passageway within the optical housing to the CCD camera 50. A number of secondary optical elements can be included along the optical path within the passageway of the optical housing to focus and direct the image. For example, these secondary optical elements can include refractive lenses, filters, or reflective mirrors.

Figure 4:
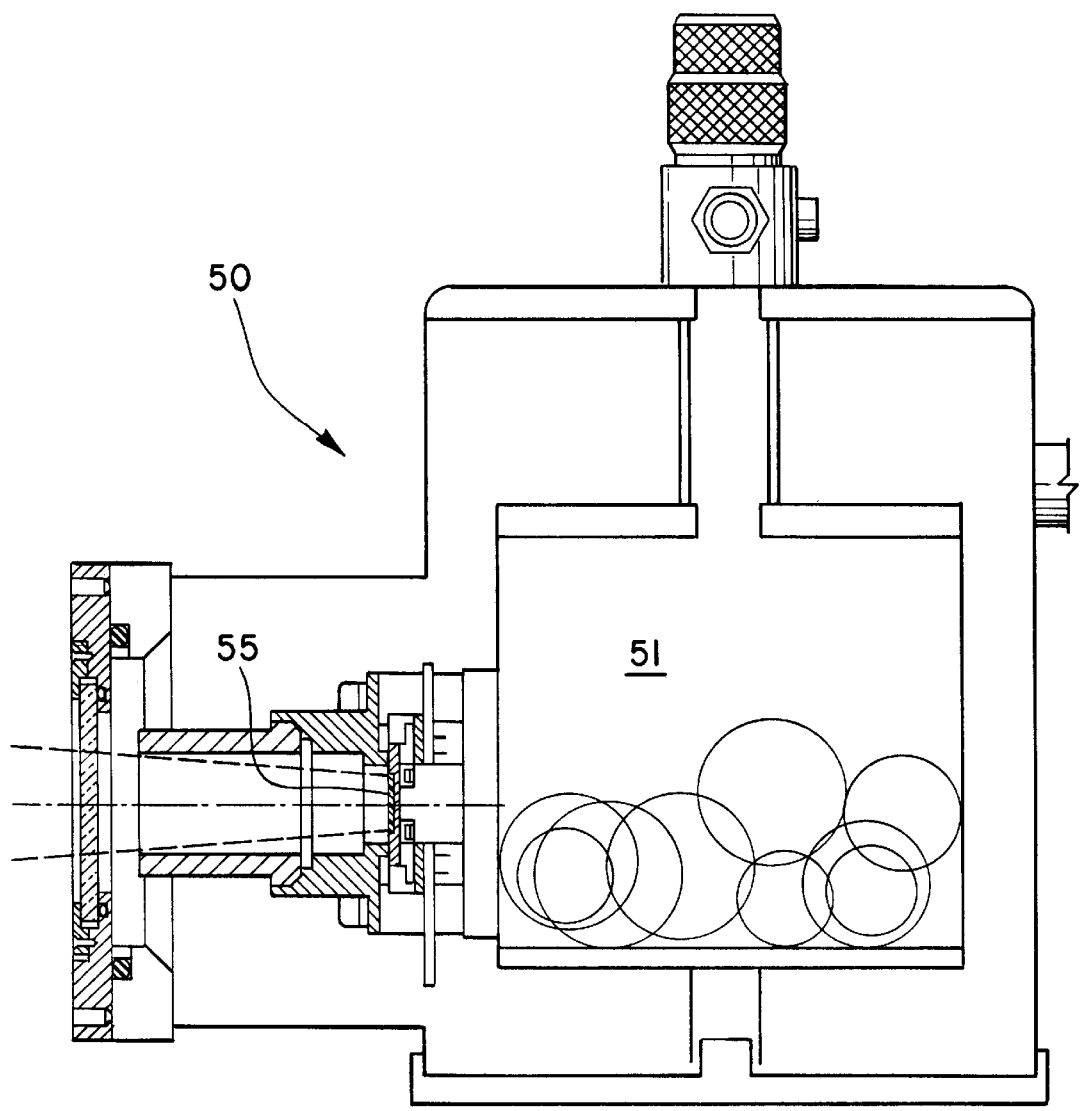
FIG. 4 is a cross-sectional view of the CCD camera 50.

Additional detail of the CCD camera 50 is shown in FIG. 4. The image received by the camera 50 focused on a CCD (charge couple device) chip 55 that converts the image into digital data in the form of a two-dimensional array of pixels. As shown in FIG. 4, the camera 50 also includes a Dewar flask 51 containing liquid nitrogen to cool the CCD chip 55 to its proper operating temperature. A CCD camera manufactured by Amber Engineering with a 128×128 pixel array has been found to be satisfactory for the present system.

Figure 5:
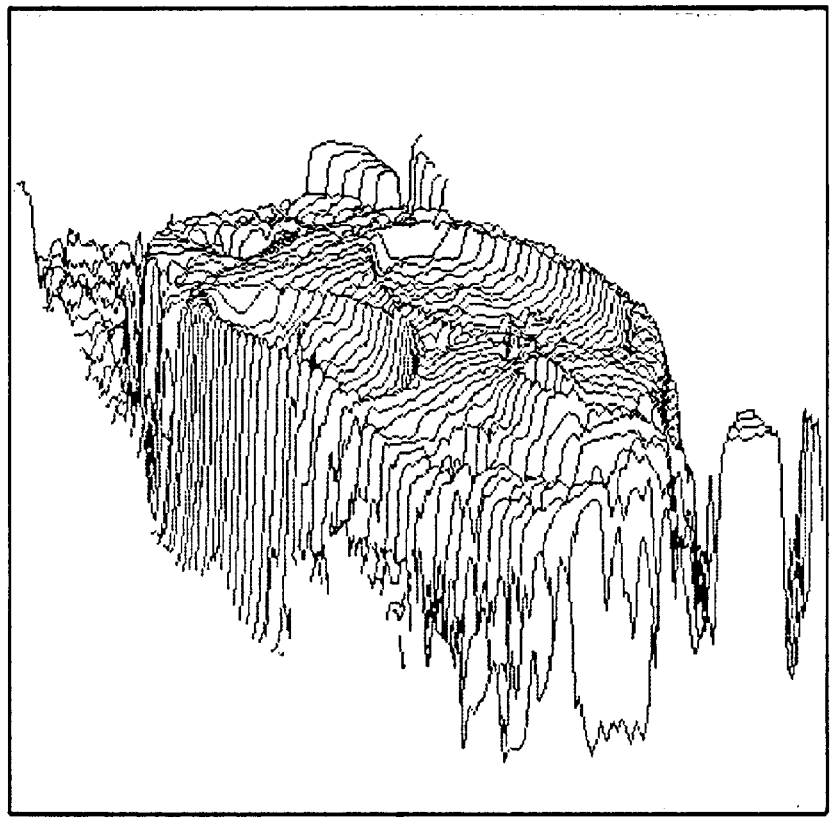
FIG. 5 is a graph showing an example of a thermographic analysis of a portion of a cylinder head.
Figure 6:
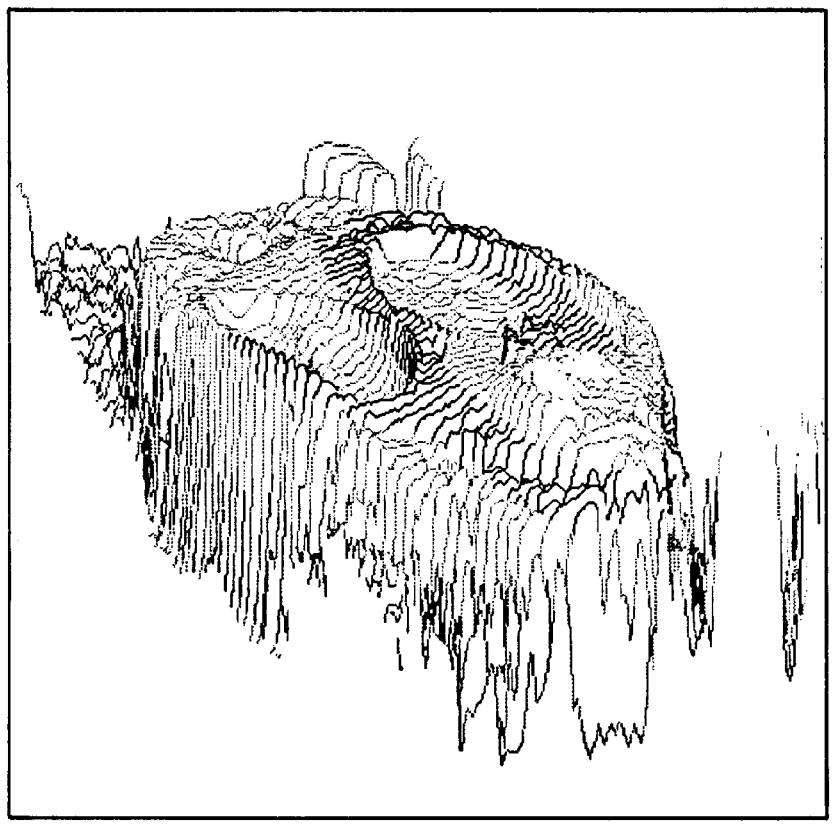
FIG. 6 is another graph showing an example of a thermographic analysis of a cylinder head.

A computer 40 periodically reads out the pixel data from the camera 50. This data can then be processed and displayed by the computer system 40. The pixel data output by the CCD chip can also be recorded on magnetic media (e.g., tape or diskettes) for subsequent viewing and/or analysis. The computer system normally includes a printer or plotter 45 to generate a hard copy of the processed image and related data. FIGS. 5 and 6 are graphs showing examples of the resulting thermographic analysis of a portion of a cylinder head.

It should be expressly understood that multiple instruments could be used concurrently by addition of an optical beam splitter to the optical path behind the primary lens. For example, this would allow simultaneous use of infrared imaging and high-speed visible light photography.

A primary advantage of the present invention is that the optical probe can be easily and quickly removed and replaced. In testing an engine, it is sometimes desired to view the interior of the cylinder after the engine has been operated for a while to reach a steady state condition, or to view the interior of the cylinder after the engine has been subjected to long-duration operational runs. In either of these situations, a probe with an inert or "dummy" lens can be installed while the engine is operated to reach the desired state. The probe with the dummy lens is then removed and a real optical probe assembly is installed. The dummy lens provides a similar structural and thermal environment in the cylinder without the costs associated with real optical elements. In addition, this approach eliminates the possibility of a buildup of deposits on the primary optical lens during the initial operational period for the engine.

Figure 7:
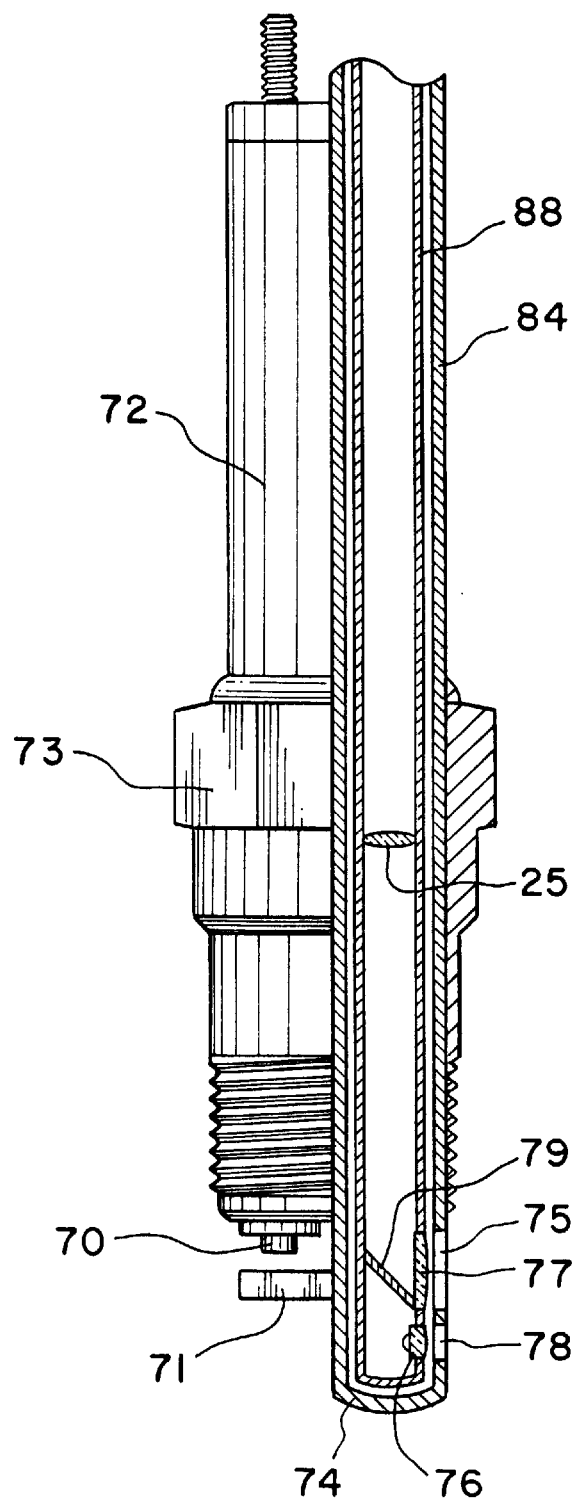
FIG. 7 is a cut-away view of the spark plug optical probe of the present invention.

In another embodiment of the present invention, a spark plug housing 73 is modified such that the electrode 70, ground strap 71, and ceramic insulation 72 for the electrode 70 are offset to one side of the assembly, as shown in FIG. 7, leaving space for the distal portion 88 of an optical housing 80 to pass through the spark plug housing 73 and adjacent to the electrode insulator 72.

Figure 8:
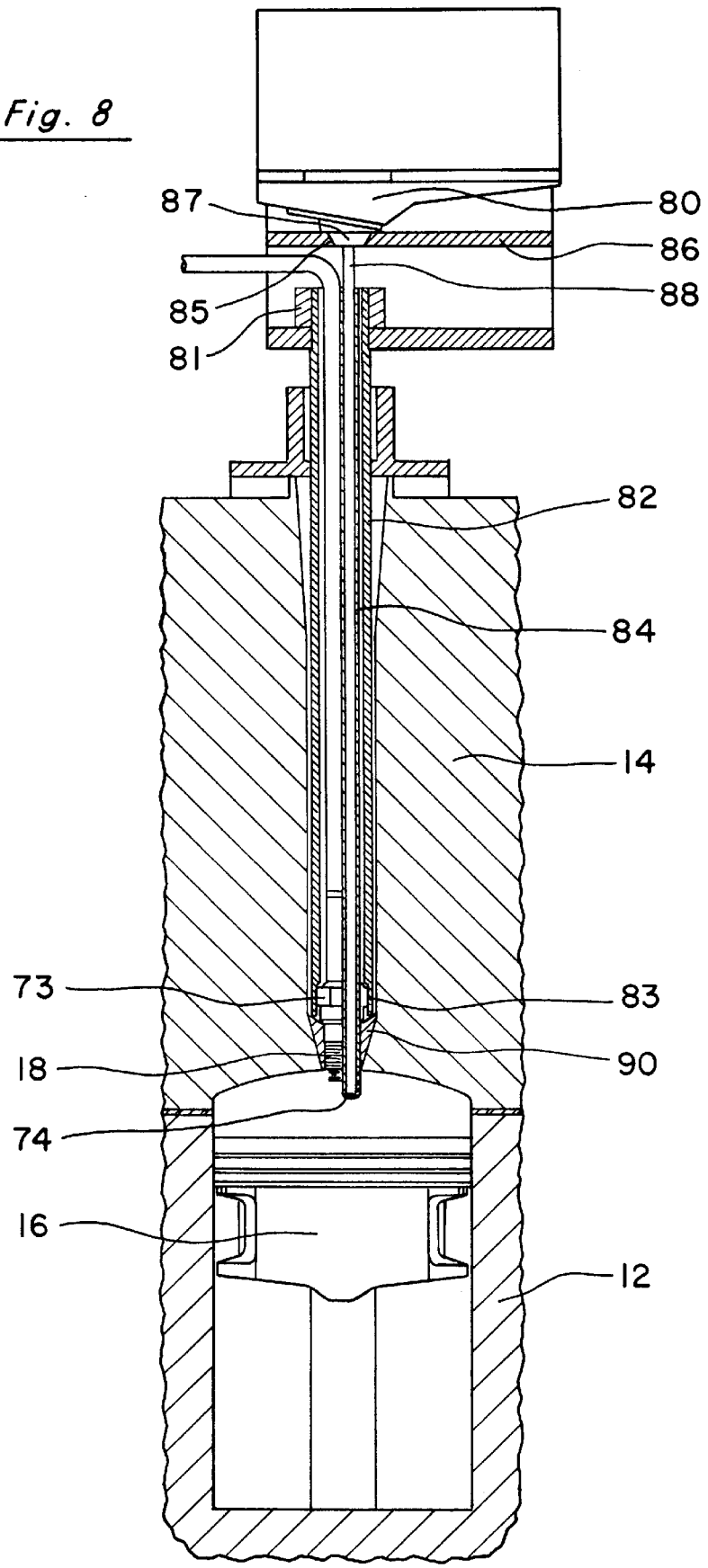
FIG. 8 is a cross-sectional view of the spark plug optical probe housed in a cylinder head.
Figure 9:
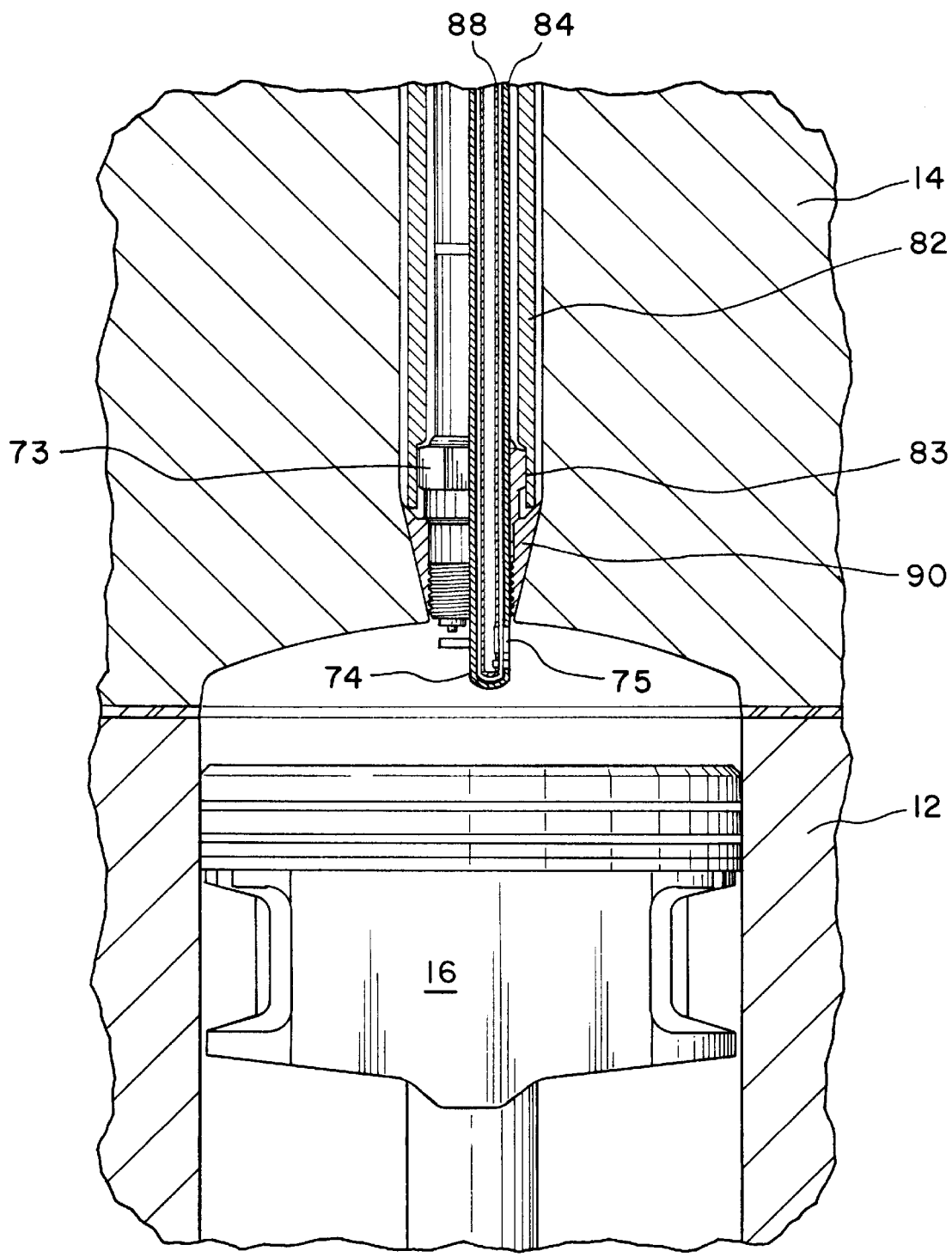
FIG. 9 is a cross-sectional view corresponding to FIG. 8 showing the spark plug optical probe.

FIGS. 8 and 9 illustrate how the optical housing 80 is mounted in the cylinder head 14. As seen in FIG. 9, a hollow tubular installation socket 82 has a faceted socket 83 in its base into which fits the correspondingly faceted spark plug housing 73 for the spark plug optical probe. A tube 84 made of stainless steel or other suitable material fits through the installation socket 82 and into the spark plug housing 73. The installation socket 82 containing the spark plug housing 73 and the stainless steel tube 84 is inserted into a hole in the cylinder head 14 and secured by screwing the spark plug housing 73 into a conventional threaded tapered hollow plug 90 (shown in more detail in FIG. 9) so that the base of the spark plug housing 73 extends into the combustion chamber. The tapered plug 90 provides a seal around the spark plug housing 73.

A support bracket 86 for the optical housing 80 is attached to the proximal end of the installation socket 82, which extends above the cylinder head 14. In the preferred embodiment, the support bracket 86 is affixed to the installation socket 82 with a hex nut 81; however, it is clear that other attachment devices could be used. The optical housing 80 has extending from it a tubular distal portion 88 through which images are transmitted by an optical train to a camera 50 as described herein above for the optical probe assembly 20. To mount the optical housing 80 on the support bracket 86, the tubular distal portion 88 of the optical housing 80 is inserted through a tapered hole 85 in the support bracket 86 and into the stainless steel tube 84, which supports and protects the tubular distal portion 88. A tapered base 87 on the optical housing 80 fits into the tapered hole 83 to provide a secure mounting for the optical housing 80, as shown in FIG. 8.

The least disruption of fuel dispersion and the best seal at the end of the stainless steel tube 84 are obtained with a transparent window, preferably made of spinel discussed herein above, conforming to and flush with the base of the spark plug housing 73. However, such a window would limit the ability to observe areas of the combustion chamber oblique to the optical train. These areas of the combustion chamber can be viewed if the distal end 74 of the stainless steel tube 84 having a transparent window 75 in its side is extended into the combustion chamber so that the window 75 is placed directly below the spark plug housing 73, as shown in FIG. 7. Such a design would also allow an illumination source 76 with a second window 78 to be placed near the first window 75. The tubular distal portion 88 of the optical housing 80 contains an objective lens 77, also made of spinel as discussed above, adjacent to the window 75. Also as discussed above, a number of secondary optical elements (such as refractive lenses 25, filters, or reflective mirrors 79) can be included along the optical path within the passageway of the optical housing to focus and direct the image.

Multiple options are available for the field of view and spatial resolution of the side-viewing objective lens 77. In the preferred embodiment, rather than using a tapered plug 90 to seal the spark plug housing 73 in the cylinder head 14, as shown in FIG. 8, crush washers of various thicknesses that enable indexing of the spark plug housing 73 are used to seal the spark plug housing 73 in the cylinder head 14. This technique accommodates 360-degree viewing by a side-viewing lens 77 having, for example, a 30-degree or 50-degree field of view and a depth of field of 2 mm to infinity, and avoids the loss of definition that occurs when an extreme wide-angle lens 77 is used. The combination of a direct-viewing spark plug optical probe having a window in its end and a side-viewing spark plug optical probe having a window in its side will permit imaging of most of the combustion chamber.

The above disclosure sets forth a number of embodiments of the present invention. Other arrangements or embodiments, not precisely set forth, could be practiced under the teachings of the present invention and as set forth in the following claims.

We claim:

1. A thermal imaging system for use in an internal combustion engine having a cylinder with a head and a hole extending through said head into said cylinder, said thermal imaging system comprising:

a lens;

a spark plug having a housing, said spark plug being inserted in said hole in said cylinder head;

an optical housing extending through said spark plug housing, said optical housing having an internal passageway with a distal portion for supporting said lens to provide a field of view within said cylinder and project an image of said field of view through said internal passageway; and camera means for receiving and recording said image provided by said optical housing.

2. The thermal imaging system of claim 1 wherein said lens is made of polycrystalline spinel.

3. The thermal imaging system of claim 1 wherein said lens is made of sapphire.

4. The thermal imaging system of claim 1 wherein said optical housing has a generally tubular shape with a distal opening, and said lens is mounted within and seals said distal opening of said optical housing.

5. The thermal imaging system of claim 1 further comprising means for removably securing said optical housing to said spark plug housing, said means comprising:

an installation socket having a distal portion for insertion in said hole in said cylinder head and having a proximal end extending above said cylinder head;

a support bracket attached to said proximal end of said installation socket, said support bracket having a tapered hole therein; and a tapered cylinder on said optical housing, said tapered cylinder being removably inserted in said tapered hole of said support bracket.

6. A thermal imaging system for use in an internal combustion engine having a cylinder with a head and a hole extending through said head into said cylinder, said thermal imaging system comprising:

a lens;

a spark plug having a housing and a space extending through said housing, said spark plug being inserted in said hole in said cylinder head;

a tubular optical housing having an internal passageway with a distal opening for insertion into said space in said spark plug housing, said lens being mounted within and sealing said distal opening of said housing to provide a field of view within said cylinder and project an image of said field of view through said internal passageway;

camera means for receiving and recording said image provided by said optical housing; and means for removably securing said distal portion of said optical housing to said hole in said cylinder wall.

7. The thermal imaging system of claim 6, wherein said lens is made of polycrystalline spinel.

8. The thermal imaging system of claim 6 wherein said lens is made of sapphire.

9. The thermal imaging system of claim 6 wherein said distal portion of said optical housing has an end that extends into said cylinder, said end further having an opening in its side, and said lens is mounted within and seals said opening of said end of said optical housing.

10. The thermal imaging system of claim 6 wherein said means for removably securing said optical housing comprises:

an installation socket having a distal portion for insertion in said hole in said cylinder head and having a proximal end extending above said cylinder head;

a support bracket attached to said proximal end of said installation socket, said support bracket having a tapered hole therein; and a tapered cylinder on said optical housing, said tapered cylinder being removably inserted in said tapered hole of said support bracket.

11. A thermal imaging system for use in an internal combustion engine having a cylinder with a head and a hole extending through said head into said cylinder, said thermal imaging system comprising:

a spark plug having a housing and a space extending through said housing, said spark plug being inserted in said hole in said cylinder head;

an installation socket having an internal passageway for insertion in said hole in said cylinder head, said installation socket having a tube with a distal opening extending along said internal passageway, said tube being inserted into said space in said spark plug housing, said distal opening having a window mounted therein sealing said distal opening;

a optical housing with a tubular distal portion for insertion into said tube, said distal portion having an end with an opening;

a lens mounted within and sealing said opening of said end of said tubular distal portion of said optical housing to provide a field of view within said cylinder and project an image of said field of view through said optical housing;

camera means for receiving and recording said image provided by said optical housing; and means for removably securing said distal portion of said optical housing to said installation socket.

12. The thermal imaging system of claim 11 wherein said tube in said installation socket has a distal portion with a sealed end, said distal portion extends into said cylinder, and said distal portion has an opening in its side with a window mounted within and sealing said opening; and wherein said end of said tubular distal portion of said optical housing within said tube extends into said cylinder, said tubular distal portion has an opening in its side, and said lens is mounted within and seals said opening in said side of said end of said tubular distal portion, said lens being adjacent to said window when said end of said distal portion of said optical housing is inserted within said tube.

13. The thermal imaging system of claim 11 wherein said end of said tubular distal portion of said optical housing further comprises an illumination source and wherein said distal portion of said tube in said installation socket further comprises a second window, said illumination source being adjacent said second window when said end of said distal portion of said optical housing is inserted within said tube.

14. The thermal imaging system of claim 11 wherein said installation socket has a proximal end extending above said cylinder head and said means for removably securing said optical housing to said installation socket comprises:

a support bracket attached to said proximal end of said installation socket, said support bracket having a tapered hole therein; and a tapered cylinder on said optical housing, said tapered cylinder being removably inserted in said tapered hole of said support bracket.

15. The thermal imaging system of claim 11 wherein said lens is made of polycrystalline spinel.

16. The thermal imaging system of claim 11 wherein said lens is made of sapphire.

17. The thermal imaging system of claim 13 wherein said first and second windows are made of polycrystalline spinel.

18. The thermal imaging system of claim 13 wherein said first and second windows are made of sapphire.

19. A thermal imaging system for use in an internal combustion engine having a cylinder with a head and a hole extending through said head into said cylinder, said thermal imaging system comprising:

a spark plug having a housing and a space extending through said housing, said spark plug being inserted in said hole in said cylinder head;

an installation socket having an internal passageway for insertion in said hole in said cylinder head, said installation socket having a tube with a sealed end and a side opening, said tube extending along said internal passageway and being inserted into said space in said spark plug housing such that said sealed end extends into said cylinder, said side opening having a window mounted therein sealing said side opening;

an optical housing with a tubular distal portion with an end for insertion into said tube, said end of said distal portion having a side opening;

a lens made of polycrystalline spinel mounted within and sealing said side opening of said end of said tubular distal portion of said optical housing to provide a field of view within said cylinder and project an image of said field of view through said optical housing;

camera means for receiving and recording said image provided by said optical housing; and means for removably securing said distal portion of said optical housing to said installation socket.

20. The thermal imaging system of claim 19 wherein said end of said tubular distal portion of said optical housing further comprises an illumination source and wherein said sealed end of said tube in said installation socket further comprises a second window, said illumination source being adjacent said second window when said distal portion of said optical housing is inserted within said tube.

21. The thermal imaging system of claim 19 wherein said lens is made of sapphire.

22. The thermal imaging system of claim 20 wherein said first and second windows are made of polycrystalline spinel.

23. The thermal imaging system of claim 20 wherein said first and second windows are made of sapphire.

24. The thermal imaging system of claim 19 wherein said installation socket has a proximal end extending above said cylinder head and said means for removably securing said optical housing to said installation socket comprises:

a support bracket attached to said proximal end of said installation socket, said support bracket having a tapered hole therein; and a tapered cylinder on said optical housing, said tapered cylinder being removably inserted in said tapered hole of said support bracket.

* * * * *